March 20, 1928.  W. C. GEER ET AL  1,663,298
RUBBER FILTER SHEET
Filed J   9  17, 1925    2 Sheets-Sheet 1
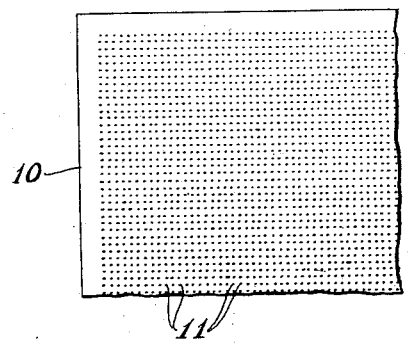
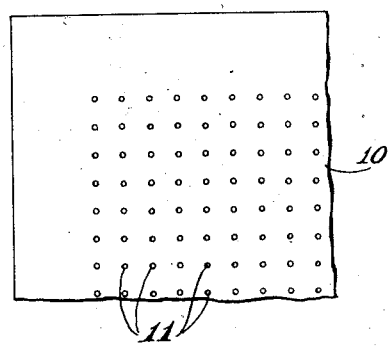
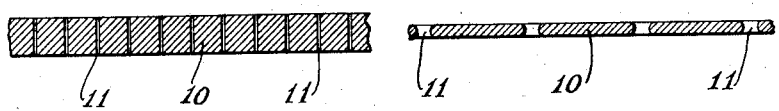
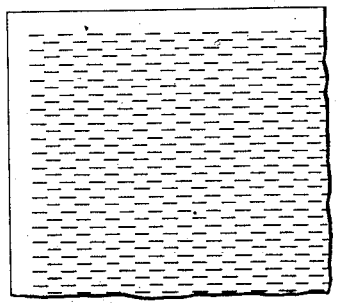
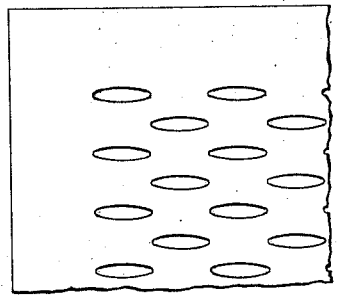
*Inventors*
*William C. Geer*
*Charles F. Sherwood*
*By Pierson, Lakin & Avery Attys.*

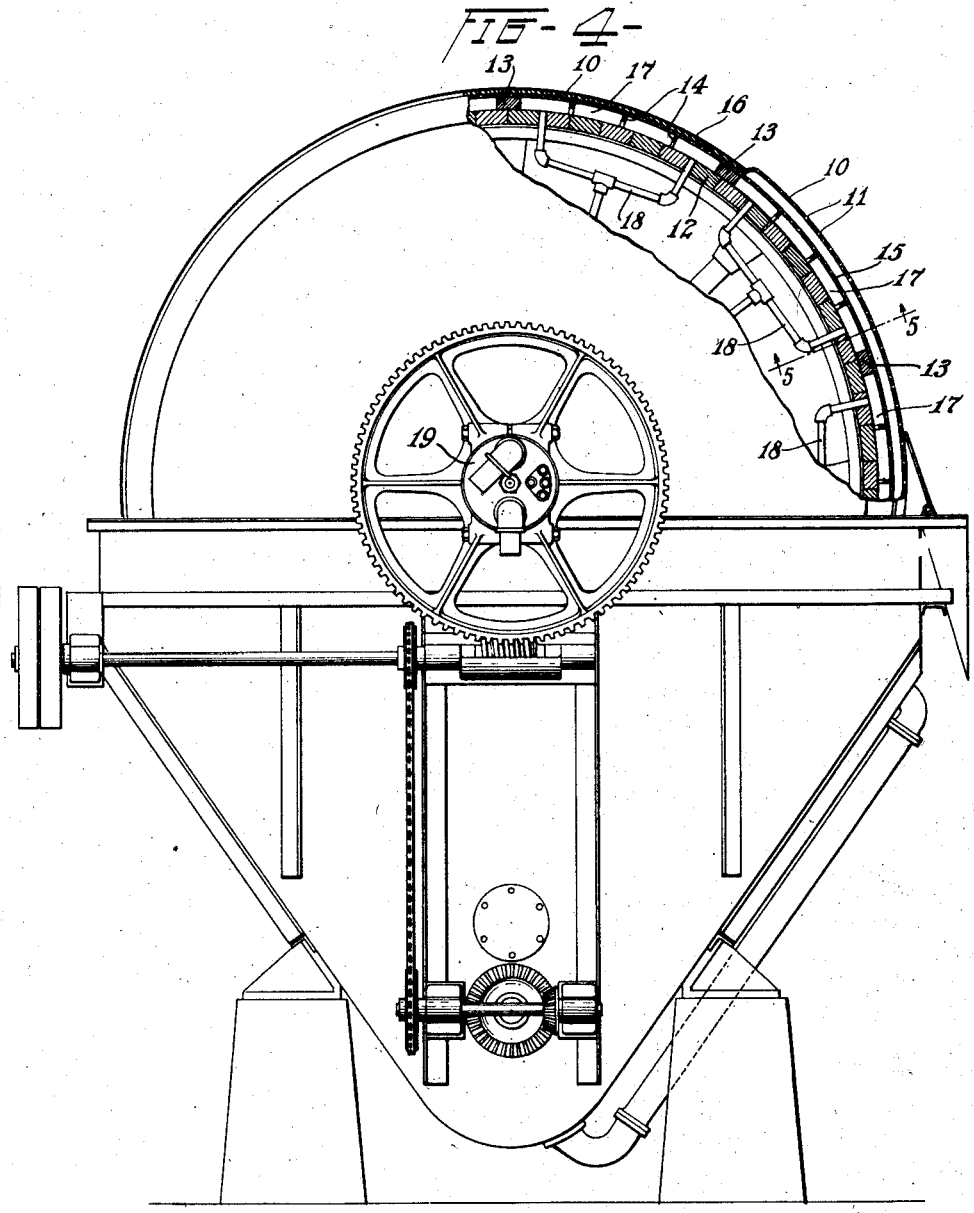
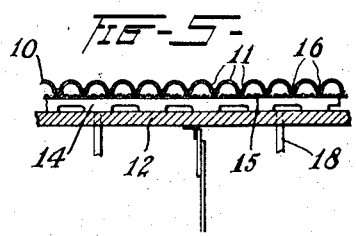

Patented Mar. 20, 1928.

1,663,298

UNITED STATES PATENT OFFICE.

WILLIAM C. GEER, OF AKRON, OHIO, AND CHARLES F. SHERWOOD, OF SAN FRANCISCO, CALIFORNIA, ASSIGNORS TO THE B. F. GOODRICH COMPANY, OF NEW YORK, N. Y., A CORPORATION OF NEW YORK.

RUBBER FILTER SHEET.

Application filed June 17, 1925. Serial No. 37,664.

This invention relates to media for effecting the separation of the liquid from the solid constituents of a body composed of mixed liquids and solids, and has for an object to provide a filter sheet which shall be self cleaning, when subjected alternately to suction and pressure, chemically inactive with respect to most materials, non-absorbent, non-corrosive, and durable under the reverse strains of alternate vacuum and superatmospheric pressures to which industrial filters are commonly subjected.

Filter media heretofore employed in vacuum filtration, usually close-woven fabric, possess certain inherent disadvantages in handling solutions in which the particles of the filter cake interlock in the interstices of the filter medium so as to resist clearing of the cloth by the usual methods of washing and counter air pressure, and consequently require frequent replacement with the attendant loss in filter material, labor, and output of the filtration apparatus. In the treatment of molasses in the beet sugar industry, it is the practice to change the filter cloths employed on rotary vacuum filters after eight hours of operation, the replacement of the filter requiring four hours, thus cutting down by ⅓ the productive capacity of the filtration apparatus.

We have discovered that elastic, vulcanized rubber sheet, when suitably perforated, inherently possesses qualities highly desirable in filter media employed in filtration apparatus handling clogging solutions. It is impervious and non-absorbent, and hence does not offer opportunity for the interlocking of solid particles in the material of the filter-sheet and the consequent gradual building up of irremovable clogs in the interstitial openings, as does woven fabric. It is non-corrosive and hence does not readily deteriorate. It is freely stretchable, and hence the cross-sectional areas of the perforations may be made to vary with the tension to which it is subjected. The latter characteristic imparts to a perforated, elastic, rubber filter-sheet its self-clearing properties since the tension placed on it by counter blasts of air enlarges the perforations, loosening the particles entrapped therein and rendering them free to be blown therefrom.

Of the accompanying drawing, Fig. 1 is a plan view of a rubber filter sheet constructed in accord with our invention; Fig. 2 is a similar view of the filter sheet shown in a stretched condition and with the perforations therein enlarged; Fig. 3 is a magnified section of the rubber filter sheet, under normal tension at the left and under an expanded, clearing tension at the right of the figure; Fig. 4 is an elevation, parts being broken away and in section, of a continuous, vacuum filter of the rotary-drum type equipped with a rubber filter sheet of the character shown in Fig. 1; Fig. 5 is a view in section on line 5—5 of Fig. 4; Fig. 6 is a plan view of a modified form of a perforated, rubber filter sheet; and Fig. 7 is a similar view of the sheet shown in the position it assumes when a clearing blast of air is blown therethrough.

Referring to the drawings, and particularly to Figs. 1 to 3, 10 represents a thin, elastic sheet of vulcanized rubber provided with small holes or perforations 11 in the sheet. The rubber sheet may be formed from a pure gum stock, or it may be compounded with ordinary rubber pigments to give to the filter sheet the desired degree of elasticity, tensile strength and resistance to abrasion. The perforations 11 may be made by piercing the sheet with a perforating die provided with the requisite number of needles per square inch, or the rubber sheet may be stretched and perforated by needles which are blunt on the end and of larger size than desired for the perforations, which, when the sheet returns to its normal size on relieving the stretching tension, will contract to the size desired.

In making long, wide, rubber filter sheets, of a character suitable for large rotary-drum filters, it may be preferable to perforate the sheet while uncured, using a very rapid vulcanizing composition that is stiff enough so that the holes punched in while uncured will not come together during cure. Thus, with a perforating calender set immediately following the cooling drums of a sheeting calender, a rapidly curing rubber stock can be calendered, cooled, perforated, and carried directly on through hot water as a curing medium in sheets of any desired length. The present invention is not however limited to any specific method of perforation or to the specific number or size of the perforations. Generally speaking, the greater the number of perforations per unit area, the higher will be the efficiency of the filter.

The filter sheet hereinabove described may be employed in any of the numerous types of filters but is particularly advantageous when employed in a filter which provides for a clearing thereof by a reverse blast of air or steam through the filter. In clearing the perforations of the filter sheet, the pressure fluid blast first stretches the rubber sheet and consequently enlarges the perforations, loosening the solids or clogs entrapped therein and then blows the clogs from without the filter. The operation is simple, may be quickly performed, and results in a thorough cleansing of the filter perforations.

In Fig. 4 the rubber filter sheet 10 is illustrated as applied to a rotary filter, which comprises a cylindrical drum 12 supporting in spaced relation therefrom, by means of partition walls 13 and bridges 14, a screen 15, commonly of course-woven wire covered with burlap. The sheet 10 is drawn around the screen 15 with a slight tension, and may be held in place thereon by means of a helically wound wire 16 in a manner ordinarily employed in this type of filter. The drum 12, walls 13 and screen 15 define a plurality of chambers 17, to which are connected the pipes 18 leading to an automatic valve 19, through which communication with a vacuum apparatus or a high pressure air or steam supply is effected at the proper positions in the rotation of the filter. This construction is conventional in filtration apparatus of this character and need not be here described.

In operation, each section of the rotary drum with its chamber 17 in rotating through its lower reach is submerged in the liquid to be filtered. The pipes 18 being connected to a vacuum apparatus, a layer of solid matter or filter cake is built up during submergence on the rubber filter sheet contiguous the chamber 17. As the section moves around the upper reach of its arcuate path, the filter cake is dried, and may be washed, if desired. Upon descending from the upper reach, the pipes 18 are disconnected from the vacuum apparatus and connected to a source of high pressure fluid. This causes the rubber filter sheet 10 to bulge from the screen 15, stretching the rubber of the sheet and enlarging the perforations 11, which are readily cleared of solid particles with the removal of the filter cake.

In Figs. 6 and 7, a modification of the filter sheet is shown. The perforations instead of taking the form of pierced holes consist of staggered rows of short slits (Fig. 6), cut into the rubber by a rotary die passing thereover or by other suitable means. The rubber in being placed upon a filter is stretched in the direction of the slits, in order to place on the edges of the slits a tension which tends to hold the perforations closed. Upon subjecting the filter sheet to a reverse blast of cleaning fluid, the perforations bulge open, as shown in Fig. 7, and the entrapped solids are readily blown therefrom.

Modifications may be resorted to without departing from the scope of our invention, and we therefore do not wholly limit our claims to the specific form thereof herein described.

We claim:

1. A filter medium comprising an elastic rubber sheet having perforations therein.

2. A filter medium comprising an elastic vulcanized rubber sheet having holes formed therein without removal of rubber from the sheet.

3. A filter medium comprising an elastic vulcanized rubber sheet having perforations pierced therein.

4. A filter medium comprising a freely stretchable sheet of a material impervious to moisture and having perforations therein.

5. A filter medium comprising a freely stretchable sheet of vulcanized rubber having numerous minute apertures therein.

6. A filter medium comprising a pervious, relatively inextensible body covered by a freely stretchable sheet of vulcanized rubber having numerous minute apertures therein.

7. A filter medium comprising a relatively coarse-woven stranded backing and a perforated, elastic, sheet-rubber facing.

8. A filter comprising a filtrate chamber having a pervious wall member, and a perforated elastic rubber sheet associated with said wall member on its outer side.

9. A vacuum filter comprising a pressure chamber having an opening in a wall portion thereof covered by a freely stretchable, perforated, vulcanized-rubber sheet, and a pervious means supporting the rubber sheet against excessive inward distortion during periods of subatmospheric pressure within said chamber.

10. A vacuum filter comprising a pressure chamber having a wall portion thereof formed of a freely stretchable, perforated rubber sheet, pervious means supporting the rubber sheet against excessive inward distortion during periods of subatmospheric pressure in said chamber, and attaching means permitting a substantial outward stretching of said sheet during periods of superatmospheric pressure in said chamber.

In witness whereof we have hereunto set our hands, said WILLIAM C. GEER this 19th day of May, 1925, and said CHARLES F. SHERWOOD this 10th day of June, 1925.

WILLIAM C. GEER.
CHARLES F. SHERWOOD.